United States Patent
Guerrieri et al.

(10) Patent No.: US 11,909,849 B2
(45) Date of Patent: Feb. 20, 2024

(54) METHOD OF COMMUNICATING INFORMATION AND CORRESPONDING DEVICE AND SYSTEM

(71) Applicant: STMicroelectronics S.r.l., Agrate Brianza (IT)

(72) Inventors: Lorenzo Guerrieri, Aosta (IT); Angelo Poloni, Fino del Monte (IT); Edoardo Lauri, Settimo Milanese (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 252 days.

(21) Appl. No.: 16/556,593

(22) Filed: Aug. 30, 2019

(65) Prior Publication Data

US 2020/0084301 A1    Mar. 12, 2020

(30) Foreign Application Priority Data

Sep. 11, 2018  (IT) .................. 102018000008489

(51) Int. Cl.
*H04L 69/18* (2022.01)
*H04L 27/12* (2006.01)
(Continued)

(52) U.S. Cl.
CPC .......... *H04L 69/18* (2013.01); *H04L 27/0012* (2013.01); *H04L 27/12* (2013.01);
(Continued)

(58) Field of Classification Search
CPC ..... H04L 69/18; H04L 27/0012; H04L 27/12; H04L 27/2643; H04L 27/2666; H04B 2203/5408
(Continued)

(56) References Cited

U.S. PATENT DOCUMENTS 6,686,832 B2    2/2004  Abraham
8,169,986 B2 *  5/2012  Jeong ............... H04W 48/12
                                         370/338
(Continued)

FOREIGN PATENT DOCUMENTS

CN    1623318 A    6/2005
CN    1965543 A    5/2007
(Continued)

OTHER PUBLICATIONS

Homeplug Powerline Alliance, Inc., "The Standard for In-Home Smart Grid Powerline Communications: An application and technology overview", HomePlug Green PHY 1.1 whitepaper, Oct. 3, 2012, 17 pages.

*Primary Examiner* — Cheikh T Ndiaye
*Assistant Examiner* — Ayele F Woldemariam
(74) *Attorney, Agent, or Firm* — Slater Matsil, LLP

(57) ABSTRACT

A communication circuit supports a first communication protocol and a second communication protocol that is different from the first communication protocol. A number of signals include first signals conveying first information messages and second signals conveying second information messages. The first information messages include a repetitive message having fixed repeated content and the second information messages include a non-repetitive message having variable content. The first signals and the second signals are transmitted via the communication circuit using the first communication protocol for the first signals and the second communication protocol for the second signals.

24 Claims, 4 Drawing Sheets

(51) Int. Cl.
  *H04L 27/00* (2006.01)
  *H04L 27/26* (2006.01)
(52) U.S. Cl.
  CPC ...... *H04L 27/2643* (2013.01); *H04L 27/2666* (2013.01); *H04B 2203/5408* (2013.01)
(58) Field of Classification Search
  USPC ........................................................ 709/236
  See application file for complete search history.

(56) References Cited

U.S. PATENT DOCUMENTS

| | | | |
|---|---|---|---|
| 8,638,741 | B2 | 1/2014 | Hariharan et al. |
| 8,743,908 | B2 | 6/2014 | Varadarajan et al. |
| 2003/0002495 | A1 | 1/2003 | Shahar et al. |
| 2005/0220218 | A1* | 10/2005 | Jensen ................ H04L 27/0008 375/302 |
| 2007/0275669 | A1 | 11/2007 | Rietman et al. |
| 2009/0322587 | A1* | 12/2009 | Stayton ................... H04L 27/18 342/37 |
| 2011/0051848 | A1* | 3/2011 | Yuk ....................... H04W 48/12 375/316 |
| 2012/0093100 | A1* | 4/2012 | Qin ...................... H04B 7/0413 370/329 |
| 2012/0134427 | A1* | 5/2012 | Guerrini ............... H04L 5/0046 375/257 |
| 2013/0004179 | A1* | 1/2013 | Nielsen .................... H04B 3/02 398/115 |
| 2013/0009787 | A1 | 1/2013 | Ree et al. |
| 2015/0022339 | A1 | 1/2015 | Matsuoka et al. |
| 2015/0365944 | A1 | 12/2015 | Jeong et al. |
| 2017/0366645 | A1 | 12/2017 | Pognant |
| 2017/0371487 | A1 | 12/2017 | Morelli et al. |

FOREIGN PATENT DOCUMENTS

| | | |
|---|---|---|
| CN | 101047589 A | 10/2007 |
| CN | 101056241 A | 10/2007 |
| CN | 102362459 A | 2/2012 |
| CN | 102780667 A | 11/2012 |
| CN | 107800526 A | 3/2018 |
| EP | 1014640 A2 | 6/2000 |
| EP | 2343856 A1 | 7/2011 |
| KR | 20130003620 A | 1/2013 |
| WO | 2013006533 A1 | 1/2013 |

* cited by examiner

METHOD OF COMMUNICATING INFORMATION AND CORRESPONDING DEVICE AND SYSTEM

CROSS-REFERENCE TO RELATED APPLICATIONS

This application claims priority to Italian Patent Application No. 102018000008489, filed on Sep. 11, 2018, which application is hereby incorporated herein by reference.

TECHNICAL FIELD

The description relates to communication techniques and, in particular embodiments, to a method of communicating information as well as a corresponding device system and operation mode.

BACKGROUND

The impact of communications in the present world is impressive. Widespread use of communication technologies and devices provides people with unprecedented opportunities to interconnect, and a new era where things are connected and communicate has just begun: to that effect the designation Internet of Things (IoT) has been created and is commonly used to indicate a communication segment where objects are part of a network configured to exchange data. These objects may pertain to different applications and the amount of data exchanged may vary from an application to another.

Data may be sensitive and people using technologies have a right in that data of private nature shall be protected, a principle that is being increasingly recognized as a priority at the human level. For instance, to this aim, the European Union has adopted in May 2018 a set of rules to be adopted and applied by member States, referred as the General Data Protection Regulation.

Data may also carry information that facilitates correct operation of an application, for instance to provide a service, to grant human security and for other purposes.

In this framework, a main function of a communication act, that is conveying with success a message from a sender to a receiver is an important goal to pursue.

Various physical communication media have been proposed and used in order to facilitate effectively sending and receiving information in different application scenarios: wireless communication, power line communication, coaxial cable communication, sound wave communications are exemplary of such communication media.

For a physical communication medium, the knowledge of the communication channel and the associated noise scenarios where a sender and a receiver are expected to operate plays an important role in designing a communication protocol able to facilitate successful communication at the physical layer level as desired.

A physical communication protocol can be implemented in a device—digital or analog—and include one or both of sender (transmitter) TX and receiver RX functions. Such devices are commonly referred to as modems.

The communication channel and noise scenario may be known to the communication designer. Oftentimes this may not be the case for various reasons.

For instance the modem may be a general-purpose modem (not "tailored" to a specific channel).

Also, while the physical communication medium may be known per se, the operational scenario cannot be predicted.

As an example one may consider a power line communication scenario where the loads connected to the power line may be various and change, possibly many times during a day.

Under these circumstances, the modem designer may rely on the knowledge available and select, based on his or her experience and analysis, the features of physical communication protocols with the aim of providing as wide as possible a coverage of the expected scenarios with a simple design.

As communication techniques improve, a communication network comprising modems implementing at a certain time a certain physical communication protocol may evolve towards a communication network comprising modems supporting at least one different physical communication protocol that is believed to offer more reliable communications in the general context. If the network is a large one, replacing a network supporting an "old" protocol with a network supporting a "new" protocol may take time. Also a transition phase may be involved where the two protocols, the old one and the new one, should co-exist.

SUMMARY

One or more embodiments can contribute in providing an improved solution.

One or more embodiments may relate to a corresponding device (a modem, for instance).

One or more embodiments may relate to a corresponding communication system.

One or more embodiments may relate to a method of operating such a communication system.

One or more embodiments may relate to a corresponding signal.

The claims are an integral part of the technical teaching provided herein in respect of the embodiments.

One or more embodiments may provide a communication system supporting (at least) two physical protocols: a first physical protocol, used for repetitive messages, and a second physical protocol, used for non-repetitive messages.

In one or more embodiments, the first physical protocol may include a first modulation (for instance a S-FSK modulation) and the second physical protocol may include a second modulation (for instance a PSK or a QAM modulation).

In one or more embodiments, the longest message length of the first physical protocol may be shorter than the longest message length of the second communication protocol.

In one or more embodiments, the number of possible messages that can adopt the first physical protocol may be lower than the number of messages that can adopt the second physical protocol.

In one or more embodiments, only a portion of the messages using the first physical protocol is part of the set of repetitive messages.

In one or more embodiments, the first physical protocol may comprise a single carrier protocol and the second physical protocol may comprise a multicarrier protocol.

In one or more embodiments, the repetitive messages may be transmitted as a function of a predetermined period.

In one or more embodiments, the two physical protocols may coexist in a time division multiplexing (TDM) scheme.

In one or more embodiments, the non-repetitive messages may be transmitted between (for instance interleaved to) repetitive messages.

BRIEF DESCRIPTION OF THE DRAWINGS

One or more embodiments will now be described, by way of example only, with reference to the annexed figures, wherein.

DETAILED DESCRIPTION OF ILLUSTRATIVE EMBODIMENTS

In the ensuing description, one or more specific details are illustrated, aimed at providing an in-depth understanding of examples of embodiments of this description. The embodiments may be obtained without one or more of the specific details, or with other methods, components, materials, etc. In other cases, known structures, materials, or operations are not illustrated or described in detail so that certain aspects of embodiments will not be obscured.

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment" or "in one embodiment" that may be present in one or more points of the present description do not necessarily refer to one and the same embodiment. Moreover, particular conformations, structures, or characteristics may be combined in any adequate way in one or more embodiments.

The references used herein are provided merely for convenience and hence do not define the extent of protection or the scope of the embodiments.

By way of introduction to a detailed description of exemplary embodiments, one may refer to a solution as disclosed U.S. Pat. No. 8,743,908 B2, providing for the possible coexistence of two physical protocols in a same frame F, namely an "old" protocol OP used for a frame preamble and a "new" packet protocol NP. Coexistence of the two is based on the fact that the new protocol NP prepends (that is, adds to the beginning) its packet with the synchronization information of the old protocol. A similar approach is adopted in the HomePlug AV power line standard (see, for instance, https://en.wikipedia.org/wiki/HomePlug), in the Hybrid mode, to allow coexistence with old HomePlug 1.0.1 devices.

Figure 1:
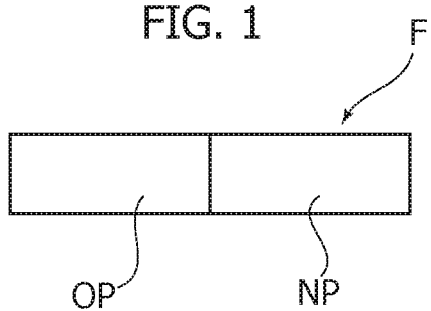
FIG. 1 is a representation of a frame format comprising two physical protocols.

According to the concept underlying the scheme represented in FIG. 1, as a result of detecting the prepended synchronization information, the old protocol (OP) modems, will be busy to try to decode a packet they cannot understand and leave the physical communication medium free for the new protocol (NP) modems. Essentially, the concept underlying the scheme represented in FIG. 1 involves using the new protocol by gradually replacing the old one with the new one. Such an approach may facilitate coexistence of two protocols during a transition period, with the new protocol expected to completely replace the old one in the long run.

When considering two different physical communication protocols, say, Protocol 1 and Protocol 2, one of the two protocols may perhaps be generally "better" than the other: for instance Protocol 2 may be generally better than Protocol 1. However, in certain application scenarios, Protocol 1 may be better than Protocol 2 as Protocol 1 has particular characteristics: that is, while, in the general case, Protocol 2 may be better than Protocol 1, a limited scenario portion may exist where Protocol 1 may be better than Protocol 2.

By way of explanation, one may consider, as an of example:
- a first communication protocol based on Frequency Shift Keying (FSK), such as Spread Frequency Shift Keying, S-FSK: as known to those of skill in the art, S-FSK is a FSK scheme involving frequencies widely spaced apart,
- a second communication protocol based on another modulation such as Phase Shift Keying (PSK) modulation or Quadrature Amplitude Modulation (QAM).

At present, it is generally acknowledged and expected that—in a general context—PSK or QAM modulations will provide better performance. An indirect confirmation of this is provided by the number of communication specification that adopt PSK and/or QAM modulations.

Specifications such as, for instance:
- the whole IEEE 802.11 series (wireless LAN),
- Long Term Evolution (LTE) wireless for mobile,
- IEEE 802.15.4 (Zigbee),
- G3-PLC, PRIME, HomePlug AV and HomePlug AV2 standards (power line communication),
- IEC 14443 (RFID),
- BlueTooth are exemplary of the tendency of communication experts to select PSK and/or QAM modulations.

On the other hand, it is noted that a protocol using S-FSK modulation may have interesting robustness properties in particular scenarios, such as in the presence of in-band narrow-band interference.

For example, in the case of a single carrier S-FSK system using two frequencies, if an interferer falls in the signal band at one of the two S-FSK frequencies, a S-FSK receiver may use the non-corrupted frequency to facilitate correct reception of a message even if the interferer is much stronger than the signal itself. Conversely, in the case of a PSK- or QAM-based single carrier system a strong narrow-band interferer falling in the signal band may cause the PSK or QAM receiver to be exposed to data corruption.

The advantage of S-FSK modulation discussed above may be perceived and appreciated (only) in a particular scenario—such as un-balanced SNRs within the two tones. This explains why keeping active two protocols may not be justified, at least at first sight: a priori, one cannot expect to be able to know at what time the scenario favorable to the S-FSK modulation will occur. Also, techniques which may predict and estimate noise may be cumbersome to introduce.

Consequently, the above example referred to S-FSK modulation bears witness to the possibility of using two communication protocols concurrently and taking the benefits of both is an area still deserving investigation.

In the following the general case of two different communication protocols, namely Protocol 1 and Protocol 2, will be considered by way of non-limiting example, being otherwise understood that the discussion (and the embodiments as well) can be extended to more than two protocols.

Also, for the sake of simplicity and ease of explanation, one of the two protocols, hereafter referred as Protocol 2, may be deemed to be "generally" better than the other protocol, hereafter referred as Protocol 1, being otherwise understood that, in certain particular applications scenarios, Protocol 1 may be better than Protocol 2.

These circumstances may occur in different application scenarios where the advantages associated with the embodiments may be appreciated.

Those of skill in the art will otherwise appreciate that the scenarios discussed herein are merely exemplary and do not limit the scope of the embodiments; also, they are pretty different and—a priori—not linked to one another.

In this latter respect, it will be appreciated that features and/or elements discussed in connection with each one of these exemplary scenarios can be transposed to the other scenarios so that a certain feature and/or element discussed in connection with a certain one these scenarios is not to be understood as linked by way of necessity (only) to that scenario.

For instance, a first possible application scenario to which embodiments may apply (as discussed in the following in connection with FIGS. 3 and 4) is a solar power generation system.

Such a solar system may comprise several (photovoltaic—PV) solar panels SP1, SP2, . . . , SPk and an inverter I. The inverter I and the panels SP1, SP2, . . . , SPk may include each a communication unit including a modem. The modem may be a DC power line modem capable of communicating signals by re-using the underlying DC voltage lines or via a different physical medium.

Another exemplary application scenario to which embodiments may apply (as discussed in the following in connection with FIGS. 5 and 6) is a house monitoring system. The system may include a local unit LU, a central unit CU and several monitoring points HM1, HM2 . . . HMn.

The monitoring points may be placed in a home HP or outside. The monitoring points HM1, HM2, . . . , HMn may include cameras or sensors and a communication unit. The communication unit of each monitoring point may include a modem that communicates to a modem placed in the local unit LU the information obtained via sensors associated to the monitoring points HM1, HM2 . . . HMn. These modems may be AC power line modems capable of communicating signals by re-using the electrical lines in the home or via a different physical medium.

The central unit CU may coincide with the local unit LU or may be located elsewhere in the case of remote monitoring; in that case the local unit could forward to the central unit a part or all the information gathered from the monitoring units.

Still another exemplary application scenario to which embodiments may apply (as discussed in the following in connection with FIGS. 7 and 8) is a traffic monitoring system.

The system may include a series of observation points 1, 2, . . . , S. Each observation point may be equipped by different sensors or cameras and a communication unit. The observation points 1, 2, . . . , S may be connected to a central unit C that gathers the traffic information and the communication units in the observation points may include modems that communicate traffic information with a modem in the central unit C. The modems may be wireless modems or power line modems.

Still another exemplary application scenario to which embodiments may apply (as discussed in the following in connection with FIGS. 9 and 10) is a "smart" city illumination system. The system may include a series of lampposts LP1, LP2, . . . , LPk, . . . , LPn and an illumination controller IC. Both the illumination controller IC and the lampposts LP1, LP2, . . . , LPk, . . . , LPn may include a communication unit, and at least for certain ones of the lampposts LP1, LP2, . . . , LPk, . . . , LPn, a sensor set. The communication units may include modems that may use the available AC power line backbone that connects the different lampposts or a different physical medium.

One or more embodiments may be based on the recognition that certain types of communications—such as those which may occur, for instance, in the exemplary scenarios discussed in the foregoing—may include a subset of messages that are repetitive, that is convey the same information several times.

Such messages can be in the form "all is ok" or "continue to do it" or "I'm here" or "keep synchronized". For sure, other repetitive messages with different semantics can be envisaged, such messages being primarily confirmatory messages, whose informative content (entropy) is essentially related to the fact that the message is sent (and received) confirming that a certain situation/condition persists and/or is not (to be) changed.

For instance, in the first exemplary application scenario discussed above (solar panel systems), the inverter I can periodically send to the panels SP1, SP2, . . . , SPk a repetitive message of the kind: "power production active", which may be sent both for starting and continuing power generation. If the message is sent periodically, absence of the repetitive message after a certain period may indicate that power production should be halted.

Conversely, non-repetitive messages may be variable in time, in that they may convey contents which vary over time. For instance, these messages may include panel temperature statistics, panel voltage or panel inclination to improve solar power capturing or similar quantities that may vary several times and with different granularity during the day. Essentially, non-repetitive messages convey informative content proper beyond the mere fact that the message is sent/received.

In the second exemplary application scenario discussed in the foregoing (a house monitoring system) a repetitive message could be "all is ok, no housebreaking". Again, this is a message whose informative content is essentially related to the fact that the message is actually sent (and received).

In a house monitoring system, non-repetitive messages may be more variable in time and content. Such non-repetitive messages may convey informative content proper beyond the mere fact that the message is sent/received, for instance by conveying information on external and/or internal house atmosphere monitoring (temperature, pressure) for use, for instance, in house air-conditioning, soil moisture monitoring to provide the proper irrigation to an external garden, internal control and use of the household appliances. Also here, non-repetitive messages convey informative content proper beyond the mere fact that the message is sent/received.

In the third exemplary application scenario discussed in the foregoing (a traffic monitoring system) a repetitive message could be "no car accident" or "traffic unit (for instance the traffic lights) operating as expected" or "traffic unit activated". Once again, these are messages whose informative content is essentially related to the fact that they are sent (and received).

Non-repetitive messages can again be more variable messages in time, whose contents may relate for instance to noise level parameters (for instance an index of the car concentration in the urban traffic monitored area) or to the level of pollution of the area including the characterization of the polluting substances or the road characteristics (ice presence, etc.). Once more, non-repetitive messages convey informative content proper beyond the mere fact that the message is sent/received.

In the fourth exemplary application scenario discussed in the foregoing (is a "smart" street lighting system), the illumination controller IC may send a repetitive message of the form "lights switched-on" to the lampposts LP1, LP2, . . . , LPk, . . . , LPn, with the same message possibly sent both for activating and maintaining street lighting. Again, if the message is sent periodically, absence of the repetitive message after a certain period may indicate that lighting should be turned-off. Once again, these are messages whose informative content is essentially related to the fact that they are sent (and received).

Conversely, non-repetitive messages may be variable in time and contents and include, for instance, environment light monitoring and sensing of car traveling through the street in order to optimize the light power and the illumination energy consumption. Once more, non-repetitive messages convey informative content proper beyond the mere fact that the message is sent/received.

Figure 2:
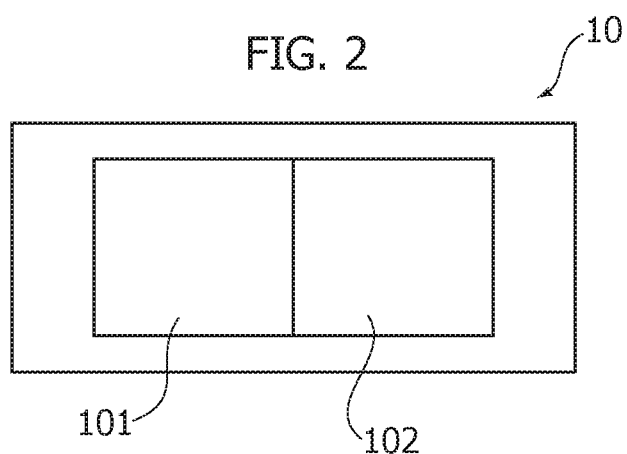
FIG. 2 is a representation of a dual-protocol modem.

One or more embodiments may comprise "dual-protocol" modem circuits as exemplified in FIG. 2 and including:

a first circuit section 101 configured to use a first physical communication protocol (say, Protocol 1) for sending and/or receiving repetitive messages, and a second circuit section 102 configured to use a second physical communication protocol (say, Protocol 2) for sending and/or receiving non-repetitive messages.

Such a dual-protocol modem 10, including a first section 101 operating with a first protocol (Protocol 1) and a second section 102 operating with a second protocol (Protocol 2), can be devised, designed and realized—on the basis of the disclosure of exemplary embodiments as provided herein—by relying on principles and criteria which are per se known to those of skill in the art. This makes it unnecessary to provide a more detailed description herein.

One or more embodiments may be based on the recognition that:

repetitive messages are intended and configured to be repeated over time with the same form or contents: as noted, the information conveyed by these messages is primarily related to the fact that these messages are sent/received (or not);

non-repetitive messages are intended and configured to take a different form or convey different contents over time: as noted, the information conveyed by these messages is primarily related to the actual contents/information conveyed thereby.

In that respect, it will be appreciated that even non-repetitive messages may be (temporarily) sent with identical contents a number of times in a row: this may be the case, for instance, of a parameter (for instance, temperature) remaining constant over two or more subsequent transmissions of the associated non-repetitive message or of re-transmission of a same non-repetitive message in case of unsuccessful communication. That is, the non-repetitive nature of a message as considered herein is primarily determined by—the capability—of such a message to convey different, variable information contents over time.

Stated otherwise:

repetitive messages are repeatedly sent as invariable, (always) identical messages over time, non-repetitive are sent as variable messages, adapted (and expected) to vary over time.

Also, as used herein, "protocol" is conformant to the conventional "classical" definition as provided at https:// www.britannica.com/technology/protocol-computer-science, that is a set of rules or procedures for sending data between electronic devices, such as computers.

Throughout this description of exemplary embodiments, reference is made for simplicity and ease of explanation to protocols (Protocol 1, Protocol 2) essentially identified and distinguished from each other due to the modulation adopted, for instance S-FSK and PSK or QAM, respectively.

Those of skill in the art will otherwise appreciate that, in one or more embodiments, Protocol 1 and Protocol 2 may be identified and distinguished from each other (only or also) for other features, such as—just to mention two by way of example—word length and/or encoding.

In one or more embodiments, the second physical communication protocol (Protocol 2) may be a protocol that in the general case is deemed to be particularly suited for use in a certain context (for instance, because it offers generally better communication performance, is more flexible, etc.).

Conversely, in one or more embodiments, the first physical communication protocol (Protocol 1) may be a protocol that, while tailored to support repetitive messages, may be less performant in general (weaker communication characteristics) or less flexible (for instance because it only supports transmission of a limited number of bits). In particular scenarios (the S-FSK capabilities with in-band narrow band interferer discussed in the foregoing may be a case in point) the first physical communication protocol (Protocol 1) may however offer appreciable advantages compared to Protocol 2.

In various operational contexts as those presented—just by way of possible examples—in FIGS. 3 to 10, adopting the expectedly "less performant" Protocol 1 for repetitive messages may end up by providing improved performance of the whole process of exchanging both repetitive messages (using Protocol 1) and non-repetitive messages (using Protocol 2), with the assumed drawbacks or limitations of Protocol 1 compared to Protocol 2 being s somehow absorbed.

Even without wishing to be bound to any specific theory in that respect, a possible reason for this may lie in that message repetition may somehow palliate the drawbacks/limitations of Protocol 1, thus improving the performance level of Protocol 1.

By way of—tentative—explanation, one may consider the common practice of encoding information sent over communication channels.

Channel encoding is a procedure wherein, in order to protect a message from the effect of channel attenuation and selectivity and noise, controlled redundancy is added by the sender to a message.

For instance, channel encoding can be represented by the following equation:

$$I=(b_0, b_1, \ldots b_n) => C=(c_0, c_1, \ldots, c_m)$$

where:

I is the original information to be transmitted and $b_j$ are bits, j=0,1, . . . , n, C is the encoded information where $c_k$ are bits that depend on I and k=0,1, . . . , m with m>n.

At the receiver, the added redundancy is used to correct the errors introduced by the channel and noise.

As is well known to those of skill in the art, there are many ways to add redundancy, for instance an element of C may be the linear combination of some elements of I. A simple method to add redundancy is considering a repetition code that can be obtained by $$I=(b_0, b_1, \ldots, b_n) => C=(b_0, b_1, \ldots b_n, n_0, b_1, \ldots b_n, \ldots, b_0, b_1, \ldots b_n)$$

i.e., the information I is repeated many times according to a certain repetition factor r.

The benefit of coding may be measured, for instance, in terms of SNR gain, i.e. the capability to handle a lower signal-to-noise ratio at the receiver. For instance, repetition codes in a flat channel with additive white Gaussian noise (AWGN) may exhibit a SNR gain which increases with the increase of the repetition factor r:

If r=2, the SNR gain is 3 dB
If r=4, the SNR gain is 6 dB
In general,
If r=m, the SNR gain is $10*\log_{10}(m)$ dB
where $\log_{10}$, is the logarithm with base 10.

On the other hand, repetition coding—by itself, in general—may be regarded as (largely) inefficient insofar as it may drastically reduce throughput.

At least to some extent, one or more embodiments may be regarded as taking advantage of repetition to render a generally less robust protocol (Protocol 1) at least as robust as another protocol (Protocol 2). For instance a Protocol 1 based upon S-FSK modulation may become even more robust than a Protocol 2 based on PSK or QAM.

As noted, repetition coding is however inefficient per se, due to a possible throughput reduction.

One or more embodiments as exemplified herein somehow go against such a general appreciation by noting that, in various operational contexts as those presented—just by way of possible examples—in FIGS. 3 to 10, the inefficiency related of repetition codes is encompassed (that is, "absorbed") by using the less performing protocol, namely Protocol 1, for messages that are by themselves repetitive, that is messages repeatedly sent as invariable, (always) identical signals over time.

For instance, knowing that these messages are repeated identically (e.g. as confirmatory messages of a continuing condition or state) may facilitate—especially if these messages are repeated with a certain, fixed period—a "Protocol 1" receiver in increasing receiver robustness by combining various occurrences of (identical) information received repeatedly.

For instance, in the case of repetition taking place with a given period, the receiver may synchronize on that period—by resorting to known techniques, such as e.g. PLL tracking—and search the expected information (only) during particular time windows.

Also, the fact that repetitive messages are repeatedly sent as invariable, identical signals over time may facilitate receiver operation: the receiver may in fact already know what such repeated signals (expectedly selected from a set including few signals, possibly even just one signal) "will look like", with the ensuing possibility of adopting, for instance, matched filter processing or the like.

The Protocol 1 receiver may thus be relieved of the burden of unnecessary activity between a message and its repetition.

Also, as noted previously, Protocol 1 may exhibit—in certain circumstances, e.g. in-band interferers—certain intrinsic advantages compared to Protocol 2, so that Protocol 1 can be in fact used also for important messages (that are repetitive).

This is because Protocol 1 may see its robustness improved in comparison with Protocol 2 by benefitting from message repetition, while also possibly retaining certain original advantages in particular scenarios. At the same time, original advantages of Protocol 2 are preserved in sending non-repetitive messages insofar as they are unaffected by the adoption of Protocol 1 for repetitive messages.

One or more embodiments may facilitate using, for repetitive messages, a protocol (Protocol 1) which does not involve a large bandwidth and/or a high signal power to be sent and, particularly, a protocol which—in comparison to Protocol 2—involves a narrower bandwidth and/or a lower signal power to be sent, which may be (even largely) beneficial in terms of communication resources. For instance, in one or more embodiments Protocol 1 may be selected as a protocol involving a low power, thus reducing power absorption, which may be suited for transmission e.g. from sensors powered via harvester circuits.

This by also taking into account that, in scenarios such as those exemplified herein, repetitive messages/signals may be predominant (even largely) over non-repetitive messages/signals, in that repetitive messages/signals may be transmitted most of the time (e.g. at relatively short intervals from one another) and non-repetitive messages/signals transmitted less frequently (e.g. at relatively long intervals from one another), if not only seldom or rarely.

For instance, in one or more embodiments, Protocol 1 may be a single-carrier protocol (that is, a protocol involving signal transmission over a single carrier), while Protocol 2 may be a multi-carrier protocol (that is, a protocol involving signal transmission over a two or more carriers).

Also, in one or more embodiments, Protocol 1 (used for repetitive messages) and Protocol 2 (used for non-repetitive messages) may coexist—that is can be both supported—on a same carrier or system by resorting to various solutions known to those of skill in the art: Time Division Multiplexing (TDM) or Frequency Division Multiplexing (FDM) are exemplary of such solutions.

Figure 3:
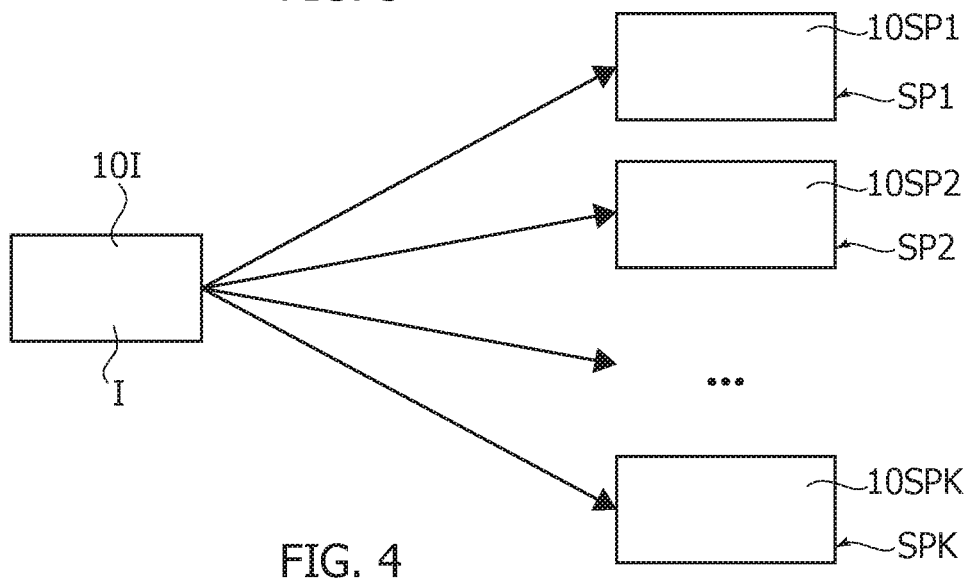
FIGS. 3 and 4 are exemplary of a possible application scenario of embodiments.

Turning again to FIGS. 3 to 10, in the first exemplary application scenario considered in the foregoing (a photovoltaic power generation system comprising—in a manner known per se—an inverter I and a plurality of solar panels SP1, SP2, . . . , SPk) Protocol 1 may be used by a "dual-protocol" modem 10I in an communication unit in the inverter I to periodically send to the modems 10SP1, 10SP2, . . . , 10SPk in the photovoltaic panels SP1, SP2, . . . , SPk repetitive messages with semantics: "power production active" as schematically represented in FIG. 3.

Such a repetitive message can be identically sent both for starting and for continuing power production, with the direction (command) to halt power production possibly conveyed by discontinuing the periodical transmission of that signal.

Of course, such a repetitive message may convey the same semantics with a different arrangement (like "power injection uninterrupted") selected out of a gamut of possible options.

Figure 4:
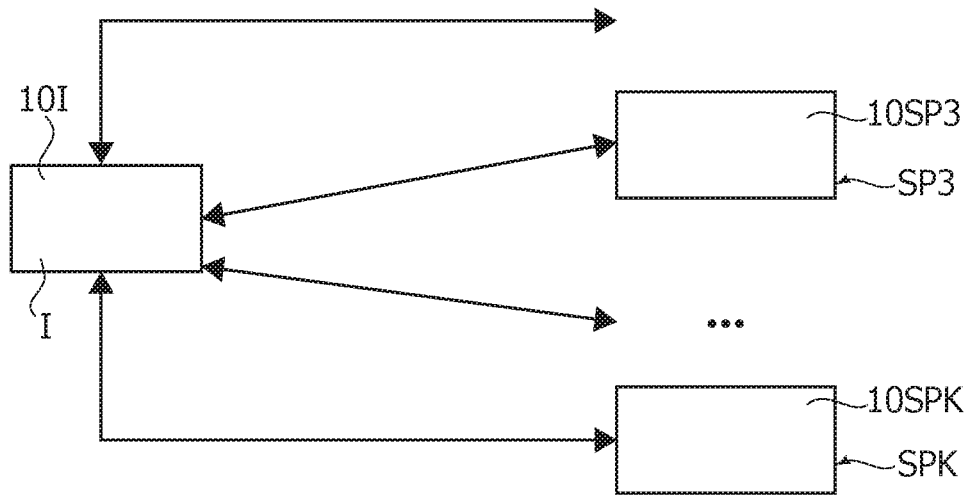

As schematically represented in FIG. 4, Protocol 2 may be used by the inverter modem 10I and panel modems 10SP1, 10SP2, . . . , 10SPk for exchanging, e.g. panel temperature statistics, panel voltage data or panel inclination to optimize solar power capturing or similar quantities that may vary several times and with different granularity during the day and that deserve monitoring.

In one or more embodiments, Protocol 1 may have a fixed number of bits sent while Protocol 2 may be more "general purpose", for instance with variable granularity with the number of bits sent.

Also, Protocol 1 may have a limited set of possible messages/message lengths out of which the repetitive messages can be selected.

In one or more embodiments, Protocol 2 may be a more sophisticated protocol admitting a wide variety of possible non-repetitive messages to choose from, possibly with variable message lengths.

By way of example, Protocol 1 may be based on a first modulation, for instance, S-FSK modulation and Protocol 2 may be based on a second modulation, for instance PSK or QAM modulations.

Also, Protocol 1 may be devised for uni-directional communication (for instance, only from the inverter modem 10I to the panel modems 10SP1, 10SP2, . . . , 10SPk).

Conversely, Protocol 2 may be devised for bi-directional communication, e.g. with panel modems 10SP1, 10SP2, . . . , 10SPk capable of answering requests from the inverter 10I or simply acknowledging the reception of inverter messages. Also, as schematically represented in FIG. 4, Protocol 2 may facilitate making exchange of messages selective, e.g. with messages from the inverter modem I10I sent individually (only) to selected ones of the panel modems, e.g. 10SP3 and 10SPk.

As noted, both Protocol 1 and Protocol 2 messages may be carried by DC-power lines from the solar panels to the inverter.

The second exemplary application scenario discussed in the foregoing comprises a house monitoring system of a house property HP including—in a manner known per se—house monitoring units HM1, HM2, . . . , HMn as well as a local unit LU in the house possibly communicating with a central unit CU, e.g. at the police department or a (private) surveillance center SC.

In one or more embodiments, these units may be equipped with respective "dual-protocol" modems (not expressly visible in the figures for simplicity).

Figure 5:
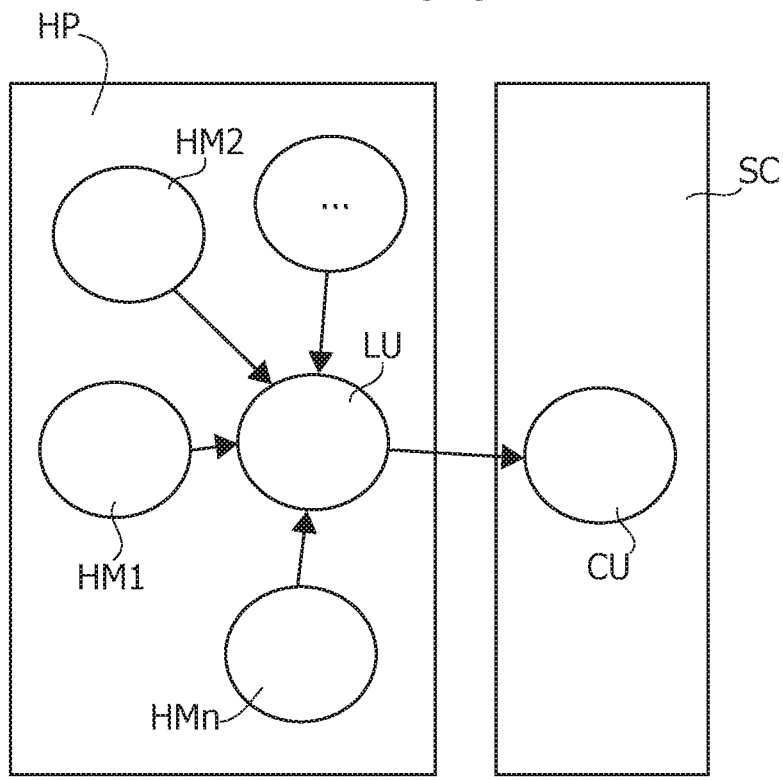
FIGS. 5 and 6 are exemplary of a possible application scenario of embodiments.

For instance, as exemplified in FIG. 5, the modems in the house monitoring units HM1, HM2, . . . , HMn may use Protocol 1 to send a repetitive message, that, by example, may have the semantics "all OK, no housebreaking detected" to the modem in the local unit LU.

For instance, if the message is sent using a periodicity known both at the sender and at the receiver, the receiver in the local unit LU may detect that something is not OK if the message is not received at the expected time (the expected time may be different for the different house monitoring units HM1, HM2, . . . , HMn).

The modem in the local unit LU may use Protocol 1 to run a similar repetitive message communication with a modem in the central unit CU. As noted, the central unit CU may be located at a police department or at a private surveillance center, thus facilitating generating real time alarms (as exemplified in FIG. 5).

Figure 6:
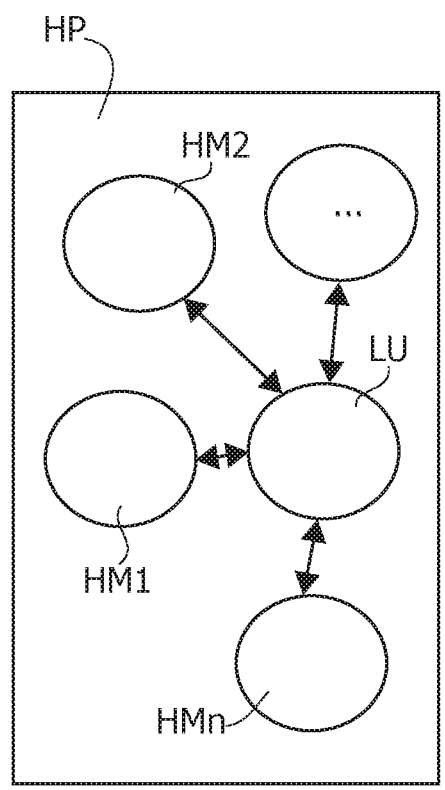

As exemplified in FIG. 6, Protocol 2 may be used instead in connection with other messages that are variable over time and can be used to convey information content including, without limitation, external and/or internal house atmosphere monitoring (temperature, pressure). This time—variable information can be used, for instance, to support house air-conditioning or to facilitate soil moisture monitoring to provide the proper irrigation to an external garden, internal control and use of the household appliances.

In one or more embodiments, Protocol 1 may have a fixed number of bits sent while Protocol 2 may be more general purpose, for instance with variable granularity with the number of sent bits.

Again, Protocol 1 may have a limited set of possible messages/message lengths out of which the repetitive messages can be selected.

In one or more embodiments, Protocol 2 may be a more sophisticated protocol admitting a wide variety of possible non-repetitive messages to choose from, possibly with variable message lengths.

By way of example, Protocol 1 may be based on a first modulation, for instance, S-FSK modulation and Protocol 2 may be based on a second modulation, for instance PSK or QAM modulations.

Also, Protocol 1 may be devised for uni-directional communication from the house monitoring units HM1, HM2, . . . , HMn to the local unit LU and/or from the local unit LU to the central unit CU.

Protocol 2 may accommodate bi-directional communication, with the house monitoring units HM1, HM2, . . . , HMn and the local unit LU exchanging for instance domotics messages.

One or more embodiments may contemplate using Protocol 1 for repetitive messages from the local unit LU to the house monitoring units HM1, HM2, . . . , HMn, an example being a message with semantics "surveillance camera(s) active", which again may be used both to turn on the camera(s) addressed and to keep it/them turned on.

For instance, the modems in the monitoring units HM1, HM2, . . . , HMn, may use an in-home power line to communicate with the modem in the local unit LU.

The third exemplary application scenario considered in the foregoing comprises a traffic monitoring system including—again in a manner known per se—various traffic observation points (cameras, for examples) 1, 2, 3, . . . , S and a central traffic monitoring unit or center C.

In one or more embodiments, these units may be equipped with respective "dual-protocol" modems (not expressly visible in the figures for simplicity).

Figure 7:
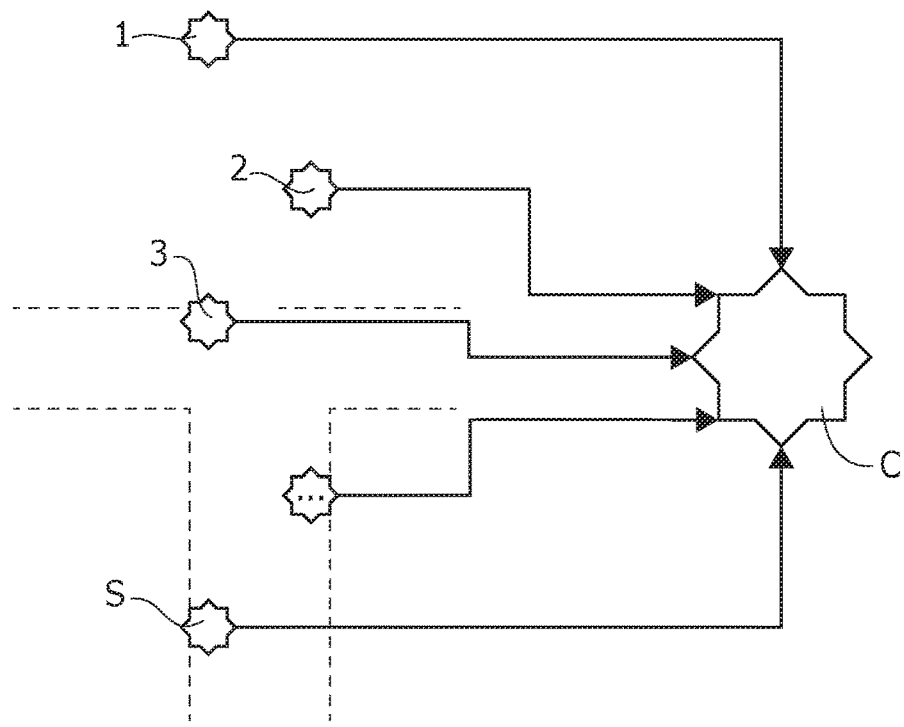
FIGS. 7 and 8 are exemplary of a possible application scenario of embodiments.

In one or more embodiments, as exemplified in FIG. 7, Protocol 1 can be used by the modems in the traffic observation points 1, 2, 3, . . . , S to send repetitive messages such as "there is no car accident" or "the traffic unit—for instance traffic lights—are functioning as expected" to the central unit C.

Figure 8:
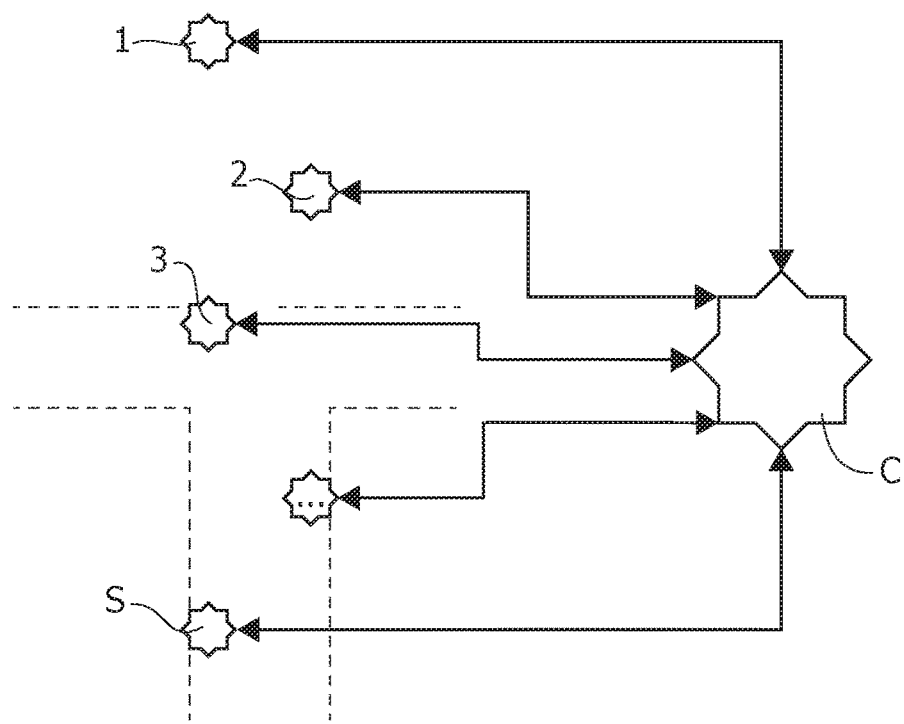

In one or more embodiments, as exemplified in FIG. 8, communication with variable messages in time and content may take place by using Protocol 2. These variable messages may relate, for instance, to certain noise level parameters (these cam be indicative of the car concentration in the urban traffic monitored area) or to a level of pollution of the area, possibly including the characterization of the polluting substances or the road characteristics (ice presence, etc.).

Once more, in one or more embodiments, Protocol 1 may have a fixed number of bits sent while Protocol 2 may be more general purpose, for instance with variable granularity with the number of sent bits.

Again, Protocol 1 may have a limited set of possible messages/message lengths out of which the repetitive messages can be selected.

In one or more embodiments, Protocol 2 may be a more sophisticated protocol admitting a wide variety of possible non-repetitive messages to choose from, possibly with variable message lengths.

By way of example, Protocol 1 may be based on a first modulation, for instance, S-FSK modulation and Protocol 2 may be based on a second modulation, for instance PSK or QAM modulations.

Also, Protocol 1 may be devised for uni-directional communication from the traffic observation points 1,2, . . . , S to the central unit.

Protocol 2 may accommodate bi-directional communication, e.g. with the central unit C gathering road and car traffic parameters and possibly sending information to be transferred to signs/displays to assist drivers.

The fourth exemplary application scenario considered in the foregoing comprises a "smart" street lighting system, including—again in a manner known per se—a number of light radiation sources (e.g. lamp posts) LP1, LP2, . . . , LPk, . . . , LPn controllable by an illumination controller IC in illuminating a street, a road, a square, and so on.

Also in this scenario, the light radiation sources LP1, LP2, . . . , LPk, . . . , LPn and the controller IC In one or more embodiments may be equipped with respective "dual-protocol" modems (again not expressly visible in the figures for simplicity).

Figure 9:
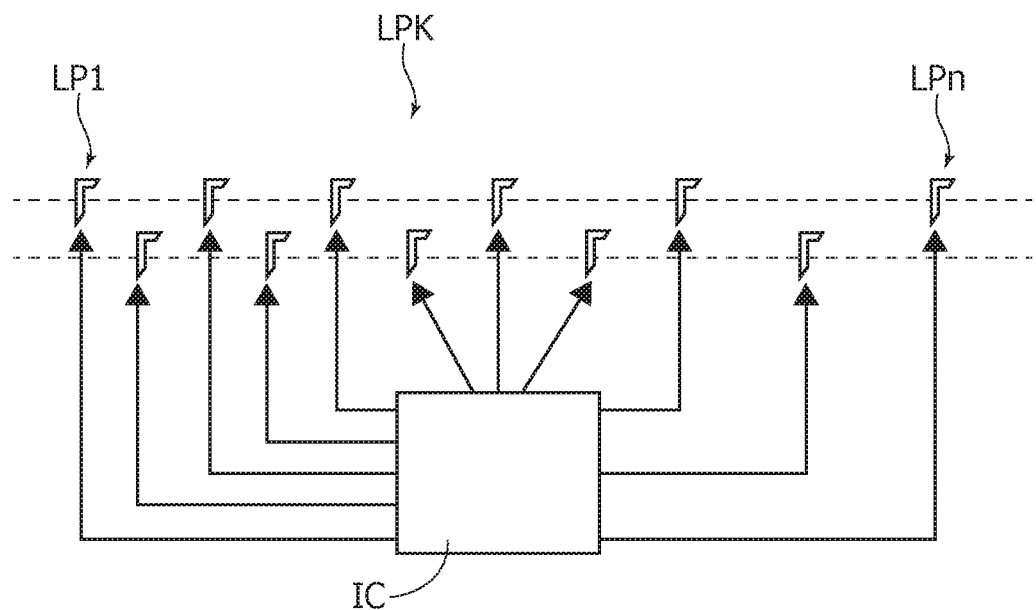
FIGS. 9 and 10 are exemplary of a possible application scenario of embodiments.

In one or more embodiments, as exemplified in FIG. 9, the modem in the illumination controller IC can use Protocol 1 to send a repetitive message of the form "light source activated" or a message with similar semantics to the modems in the lampposts LP1, LP2, . . . , LPk, . . . , LPn.

In one or more embodiments, such a message can be sent with a regular time periodicity starting from a determined hour of the day (for instance after sunset).

Figure 10:
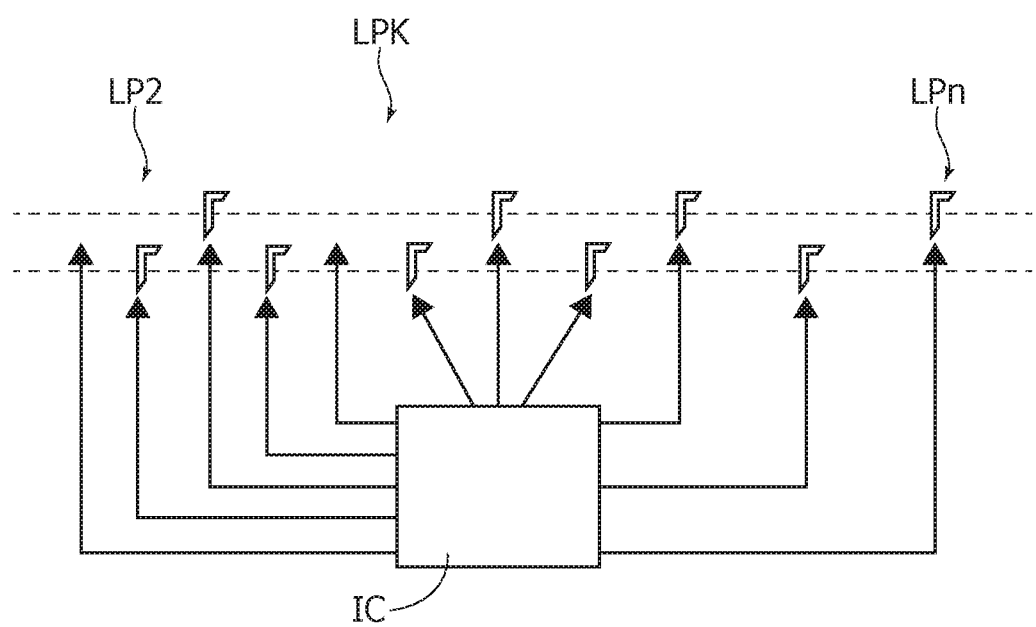

In one or more embodiments, as exemplified in FIG. 10, Protocol 2 can be used by the modems in the illumination controller IC and in the lampposts LP1, LP2, . . . , LPk, . . . , LPn, for exchanging messages that are variable in time and content and may include environment light monitoring and sensing of car traveling through the street in order to optimize the light power and the illumination energy consumption.

Protocol 2 may also facilitate selective communication of the illumination controller IC even with selected ones of the lampposts, for instance, as exemplified in FIG. 10, with LP2 by excluding LP1.

Once more, Protocol 1 may have a limited set of possible messages/message lengths out of which the repetitive messages can be selected.

In one or more embodiments, Protocol 2 may be a more sophisticated protocol admitting a wide variety of possible non-repetitive messages to choose from, possibly with variable message lengths.

By way of example, Protocol 1 may be based on a first modulation, for instance, S-FSK modulation and Protocol 2 may be based on a second modulation, for instance PSK or QAM modulations.

Also, Protocol 1 may be devised for uni-directional communication from the illumination controller IC to the lampposts LP1, LP2, . . . , LPk, . . . , LPn.

Conversely, Protocol 2 may accommodate bi-directional communication, with the illumination controller IC and the lampposts LP1, LP2, . . . , LPk, . . . , LPn, exchanging more sophisticated information, possibly related to sensors installed on the lampposts LP1, LP2, . . . , LPk, . . . , LPn. The modem in the illumination controller IC and the modems in the lampposts LP1, LP2, . . . , LPk, . . . , LPn may be connected using the already existing power line backbone of the lighting system.

In one or more embodiments, a method may comprise:
providing a communication circuit (for instance, a modem such as 10) for transmitting (for instance, sending and/or receiving) signals conveying information messages, the communication circuit supporting a first communication protocol (for instance, portion lot in FIG. 2) and a second communication protocol (for instance, portion 102 in FIG. 2), the second communication protocol different from the first communication protocol, including in the signals first signals conveying first information messages and second signals conveying second information messages, the first information messages comprise at least one repetitive message having fixed repeated content (for instance: "all is OK", "continue to do it", "I am here.", "keep synchronized") and the second information/messages comprise at least one non-repetitive message having variable content (for instance, temperature pressure, statistics, concentration index, cars travelling in street), and transmitting the first signals and the second signals via the communication circuit using the first communication protocol for the first signals and the second communication protocol for the second signals.

In one or more embodiments, the first communication protocol and the second communication protocol may comprise different modulations for the first signals and the second signals, respectively.

In one or more embodiments, the first communication protocol may comprise FSK modulation, optionally S-FSK modulation.

In one or more embodiments, the second communication protocol may comprise modulation selected out of PSK modulation and QAM modulation.

In one or more embodiments:
the first communication protocol may have a longest message length shorter than the longest message length of the second communication protocol, and/or
the first communication protocol and the second communication protocol may comprise a single-carrier protocol and a multi-carrier protocol, respectively, and/or
the first communication protocol may have a bandwidth occupancy narrower than the bandwidth occupancy of the second communication protocol.

One or more embodiments may comprise transmitting the first signals and the second signals via the communication circuit using for the first communication protocol a signal strength lower than the signal strength used for the second communication protocol.

One or more embodiments may comprise including in the signals a set of the first signals and a set of the second signals, wherein the set of the first signals is less numerous than the set of the second signals.

One or more embodiments may comprise transmitting the first signals and the second signals via the communication circuit via time domain and/or frequency domain multiplexing.

In one or more embodiments, transmitting the first signals and the second signals via the communication circuit may comprise interleaving the first signals and the second signals.

One or more embodiments may comprise transmitting the first signals via the communication circuit using the first communication protocol with a fixed repetition rate.

In one or more embodiments, a device (for instance, a modem such as 10) may comprise a communication circuit configured (see, for instance, the two circuit sections 101 and 102 of the modem 10 of FIG. 2) to communicate—that is, send and/or receive—first signals conveying first information messages and second signals conveying second information messages, wherein the first information messages comprise at least one repetitive message having fixed repeated content and the second information messages comprise at least one non-repetitive message having variable content, the communication circuit configured to support a first communication protocol and a second communication protocol, the second communication protocol different from the first communication protocol, the device configured to operate with the method of one or more embodiments.

In one or more embodiments, the device may comprise a modem.

In one or more embodiments, a communication system, may comprise at least one first node (for instance, I, LU, C, IC, or, respectively, SP1, SP2, . . . , SPk; HM1, HM2, . . . , HMn; 1, 2, . . . , S; LP1, LP2, . . . , LPk, . . . , LPn) and at least one second node (for instance, SP1, SP2, . . . , SPk; HM1, HM2, . . . , HMn; 1, 2, . . . , S; LP1, LP2, . . . , LPk, . . . , LPn or, respectively, I, LU, C, IC,), the at least one first node and at least one second node equipped with a device according to one or more embodiments.

In one or more embodiments, a method of operating a system according to one or more embodiments may comprise:
sending uni-directional first signals using the first communication protocol towards the at least one first node from the at least one second node (for instance towards I, LU, C, IC from SP1, SP2, . . . , SPk; HM1, HM2, . . . , HMn; 1, 2, . . . , S; LP1, LP2, . . . , LPk, . . . , LPn or, vice-versa, towards SP1, SP2, . . . , SPk; HM1, HM2, . . . , HMn; 1, 2, . . . , S; LP1, LP2, . . . , LPk, . . . , LPn from I, LU, C, IC),
exchanging bi-directional second signals using the second communication protocol between the at least one first node and the at least one second node.

One or more embodiments may relate to a combined (for instance, dual-protocol) communication signal comprising (for instance, in a frequency-domain or time-domain multiplexing scheme, e.g. by interleaving the first signals and the second signals) first signals conveying first information messages and second signals conveying second information messages, wherein the first information messages comprise at least one repetitive message having fixed repeated content and the second information messages comprise at least one non-repetitive message having variable content, wherein the combined communication signal comprises a multi-protocol signal including a first communication protocol for the first signals and a second communication protocol for the second signals, the second communication protocol different from the first communication protocol.

Without prejudice to the underlying principles, the details and embodiments may vary, even significantly, with respect to what has been described by way of example only, without departing from the extent of protection.

The extent of protection is determined by the annexed claims.

What is claimed is:

1. A method, comprising:
having a plurality of signals, including first signals conveying first information messages and second signals conveying second information messages;
determining that the first information messages comprise a repetitive message having fixed repeated content, and, based thereon, transmitting the first signals in accordance with a first communication protocol over a powerline communication, wherein the first communication protocol comprises frequency shift keying (FSK) modulation or spread frequency shift keying (S-FSK) modulation; and
determining that the second information messages comprise a non-repetitive message having variable content, and, based thereon, transmitting the second signals in accordance with a second communication protocol over the powerline communication, wherein the second communication protocol is different than the first communication protocol, wherein the second communication protocol comprises phase-shift keying (PSK) modulation or quadrature amplitude modulation (QAM).

2. The method of claim 1, wherein the first communication protocol has a longest message length shorter than the longest message length of the second communication protocol.

3. The method of claim 1, wherein the first communication protocol comprises a single-carrier protocol and the second communication protocol comprises a multi-carrier protocol.

4. The method of claim 1, wherein the first communication protocol has a bandwidth occupancy narrower than the bandwidth occupancy of the second communication protocol.

5. The method of claim 1, wherein transmitting the first signals and the second signals comprises using a first signal strength for the first communication protocol and a second signal strength for the second communication protocol, the first signal strength being lower than the second signal strength.

6. The method of claim 1, wherein the plurality of signals comprises a set of the first signals and a set of the second signals, wherein the set of the first signals is less numerous than the set of the second signals.

7. The method of claim 1, wherein transmitting the first signals and the second signals comprises transmitting the first signals and the second signals via time domain multiplexing.

8. The method of claim 1, wherein transmitting the first signals and the second signals comprises transmitting the first signals and the second signals via frequency domain multiplexing.

9. The method of claim 1, wherein transmitting the first signals and the second signals comprises interleaving the first signals and the second signals.

10. The method of claim 1, wherein transmitting the first signals comprises transmitting the first signals using the first communication protocol with a fixed repetition rate.

11. A device, comprising:
a first communication circuit configured to communicate first signals conveying first information messages in accordance with a first communication protocol, wherein the first information messages comprise a repetitive message having fixed repeated content, and wherein the first signals are communicated over a powerline communication; and
a second communication circuit configured to communicate second signals conveying second information messages in accordance with a second communication protocol, wherein the second information messages comprise a non-repetitive message having variable content, wherein the second communication protocol is different than the first communication protocol, and wherein the second signals are communicated over the powerline communication, wherein the first communication protocol comprises FSK modulation and wherein the second communication protocol comprises phase-shift keying (PSK) modulation or quadrature amplitude modulation (QAM).

12. The device of claim 11, wherein the device comprises a modem.

13. The device of claim 11, wherein the first communication protocol has a longest message length shorter than the longest message length of the second communication protocol.

14. The device of claim 11, wherein the first communication protocol comprises a single-carrier protocol and the second communication protocol comprises a multi-carrier protocol.

15. The device of claim 11, wherein the first communication protocol has a bandwidth occupancy narrower than the bandwidth occupancy of the second communication protocol.

16. The device of claim 11, wherein sending uni-directional first signals and exchanging bi-directional second signals comprises using a first signal strength for the first communication protocol and a second signal strength for the second communication protocol, the first signal strength being lower than the second signal strength.

17. The device of claim 11, wherein the uni-directional first signals are less numerous than the bi-directional second signals.

18. The device of claim 17, wherein sending uni-directional first signals and exchanging bi-directional second signals comprises sending uni-directional first signals and exchanging bi-directional second signals via time domain multiplexing.

19. A method of communicating, the method comprising:
sending uni-directional first signals toward a communication signal node using a first communication protocol over a powerline communication, wherein the uni-directional first signals include first information messages that comprise a repetitive message having fixed repeated content; and
exchanging bi-directional second signals with the communication signal node using a second communication protocol that is different than the first communication protocol, wherein the bi-directional second signals include second information messages that comprise a non-repetitive message having variable content, and wherein the bi-directional second signals are exchanged over the powerline communication.

20. The method of claim 19, wherein the first communication protocol and the second communication protocol comprise different modulations for the uni-directional first signals and the bi-directional second signals, respectively.

21. The method of claim 20, wherein the first communication protocol comprises frequency shift keying (FSK) modulation or spread frequency shift keying (S-FSK) modulation and wherein the second communication protocol comprises phase-shift keying (PSK) modulation or quadrature amplitude modulation (QAM).

22. The method of claim 19, wherein the first communication protocol has a longest message length shorter than the longest message length of the second communication protocol.

23. The method of claim 19, wherein the first communication protocol comprises a single-carrier protocol and the second communication protocol comprises a multi-carrier protocol.

24. The method of claim 19, wherein the first communication protocol has a bandwidth occupancy narrower than the bandwidth occupancy of the second communication protocol.

* * * * *